United States Patent
Harper

[15] 3,678,749
[45] July 25, 1972

[54] FLOATLESS FLUID LEVEL GAUGE

[72] Inventor: Patrick D. Harper, 901 St. Andrews Way, Bel Air, Md. 21014

[22] Filed: Feb. 25, 1970

[21] Appl. No.: 14,132

[52] U.S. Cl. ........................................................73/304 R
[51] Int. Cl. ..........................................................G01f 23/24
[58] Field of Search ...................73/304 R; 324/29

[56] References Cited

UNITED STATES PATENTS 2,659,068  11/1953  Erickson..............................73/304 X

FOREIGN PATENTS OR APPLICATIONS 242,648  5/1946  Switzerland..............................73/304

842,554  6/1952  Germany..................................73/304

OTHER PUBLICATIONS

IBM Technical Disclosure Bulletin; Plating Range Testing by Judge et al.; from Vol. 4, No. 10; Mar. 1962

*Primary Examiner*—Louis R. Prince
*Assistant Examiner*—Denis E. Corr
*Attorney*—Plante, Arens, Hartz, Smith and Thompson, Bruce L. Lamb and William G. Christoforo

[57] ABSTRACT

A floatless, electrical, fluid level gauge is disclosed in which fluid level indication is derived from the voltage appearing at the center tap of a resistive voltage divider network. The elements of said voltage divider network comprise two volumes of the fluid to be gauged.

20 Claims, 11 Drawing Figures

Patented July 25, 1972
3,678,749
2 Sheets-Sheet 1
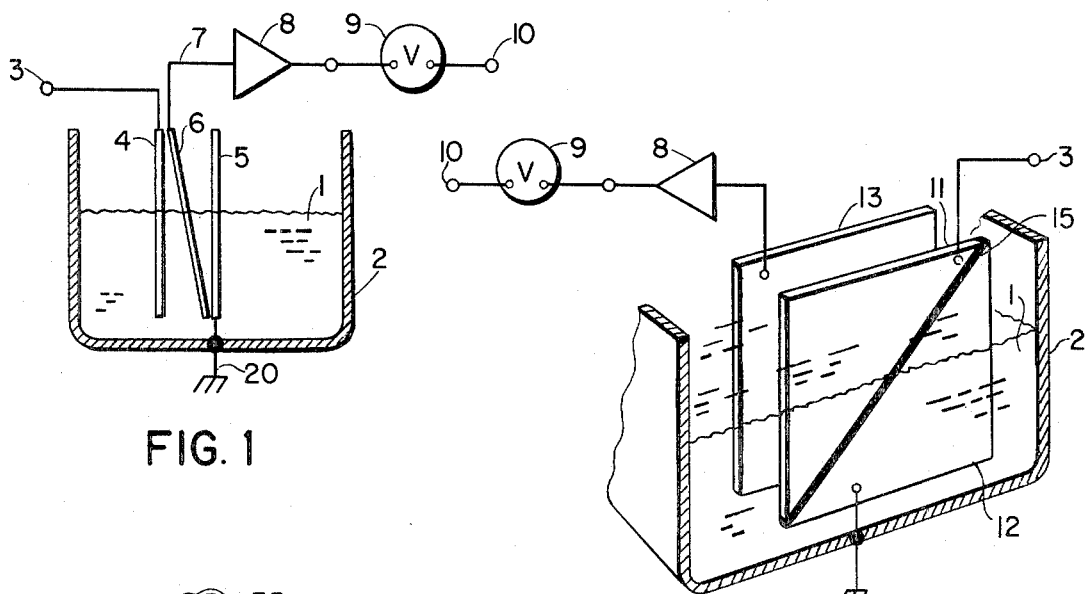
FIG. 1
FIG. 2
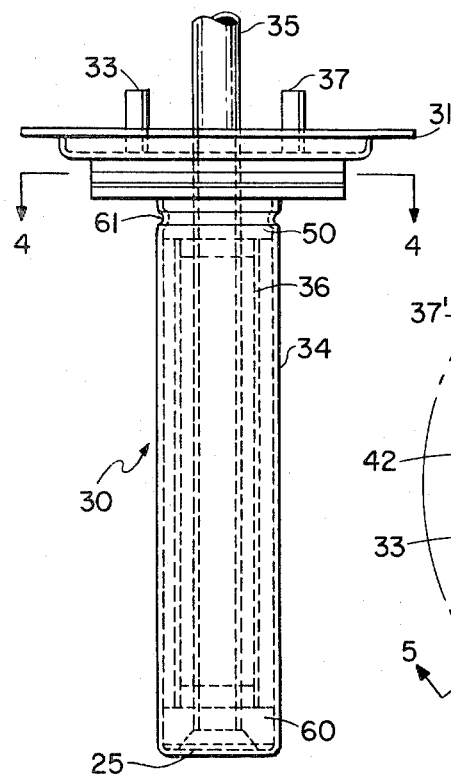
FIG. 3
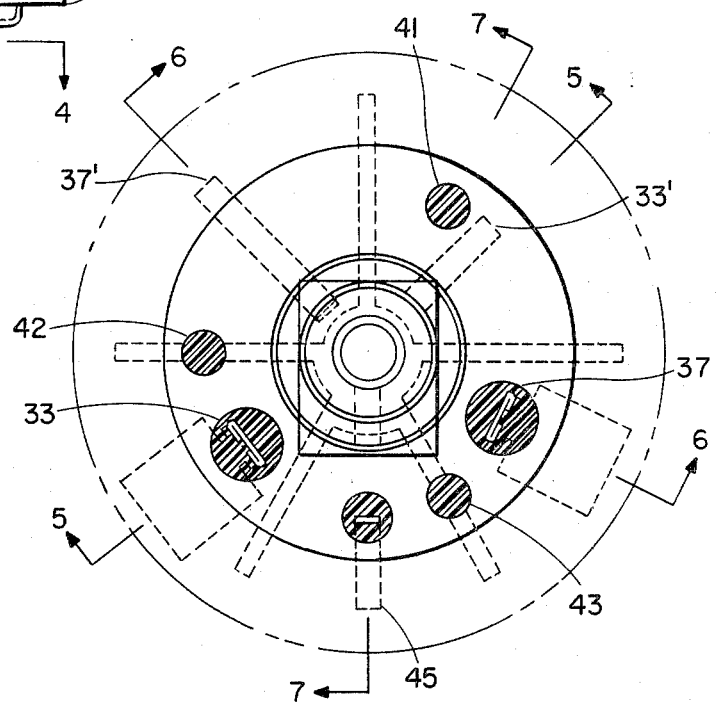
FIG. 4
INVENTOR
PATRICK D. HARPER
BY *Plantz, Arens, Nauty Smith & Thompson*
ATTORNEYS Patented July 25, 1972 3,678,749
2 Sheets-Sheet 2
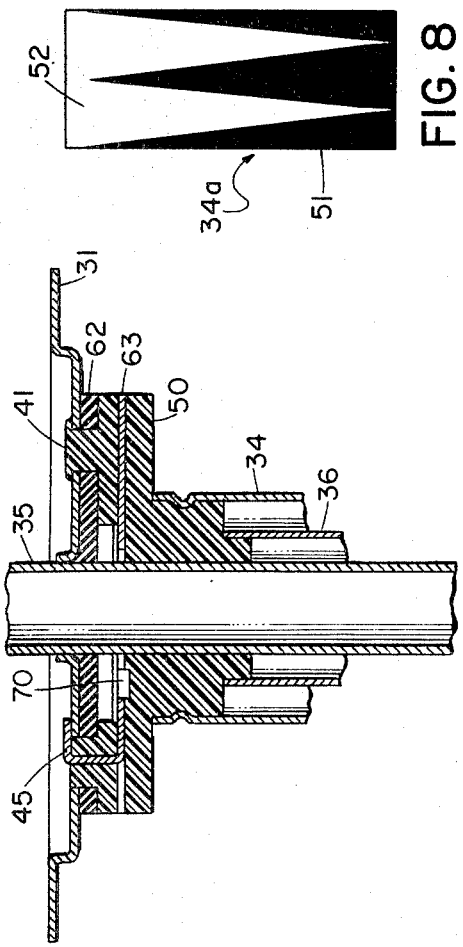
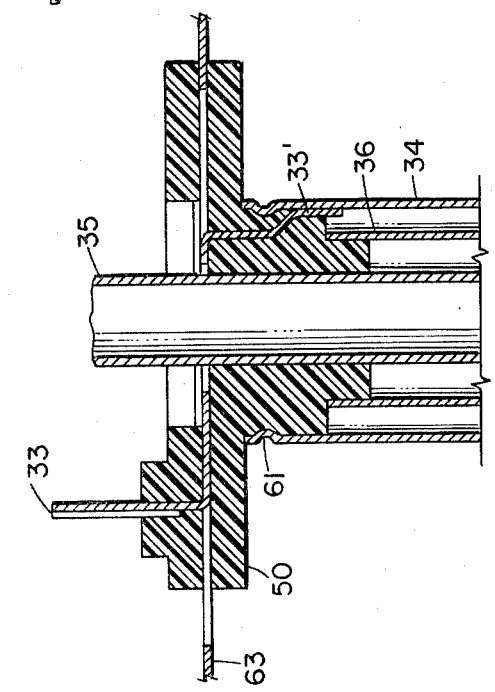
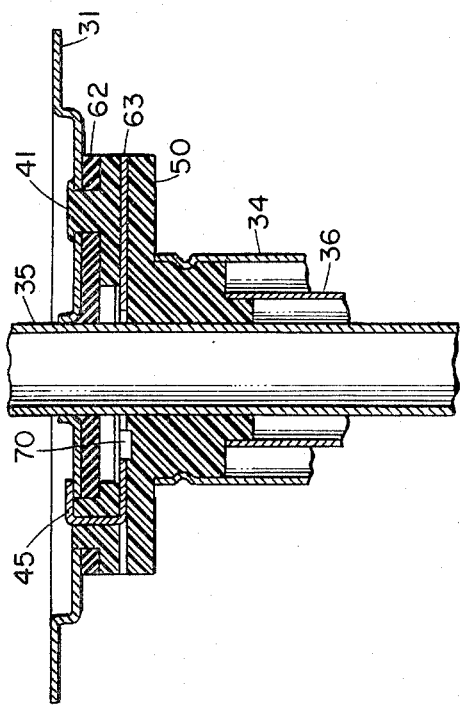
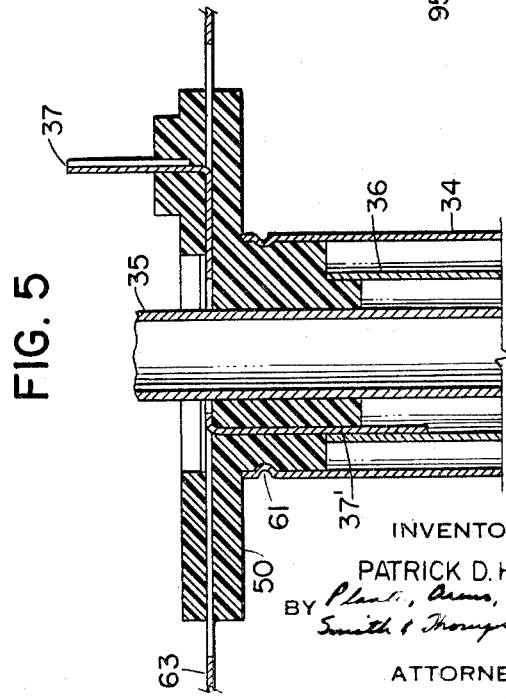
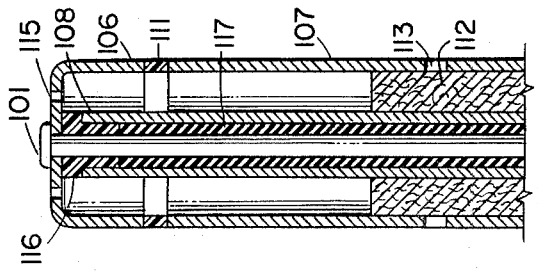
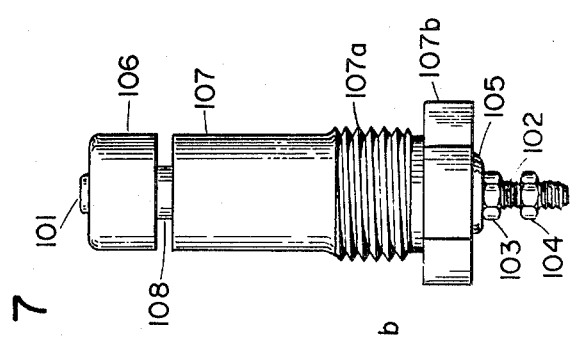
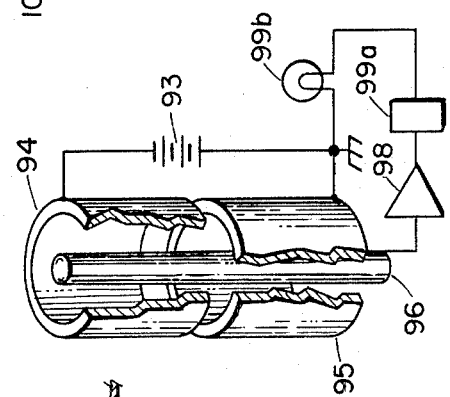
INVENTOR
PATRICK D. HARPER
BY
ATTORNEYS

FLOATLESS FLUID LEVEL GAUGE

BACKGROUND OF THE INVENTION

Float-type electrical fluid level gauges, well known in the art for several decades, are still by far the most commonly employed automotive fuel gauges. They have not been generally adapted for use as lubricating oil level gauges because the viscosity of lubricating oils would cause them to interfere with proper operation of the gauge, and because float-type gauges require a greater volume of space for operation than can be conveniently provided in an automotive crankcase.

Even in fuel gauge applications, the float-type gauges exhibit certain disadvantages. One disadvantage is a greater tendency to mechanical failure than would be exhibited by a gauge without moving parts. Another is inaccuracy of output signal resulting from surface waves in the fluid or fluid displacement as a function of vehicle attitude. Moreover, since the electrical signal is generated by a wiper arm moving across a resistance element in an atmosphere comprising gasoline vapor and air, a hazard of fire or explosion exists.

In order to overcome these disadvantages with respect to fuel gauges, and other disadvantages particular to other specific applications, various types of floatless fluid level gauges have been developed. One such type is the reactive type in which the electrical reactance of the gauge is made to vary by the presence of the fluid to be gauged at the gauge elements. See, for example, the capacitive gauge of Meyers (U.S. Pat. No. 2,741,124) and the inductive gauge of Mastras (U.S. Pat. No. 3,058,345). These gauges have the disadvantage of requiring relatively complex and expensive a. c. bridge and source circuits which add expense and decrease reliability. Another type of floatless gauge is the resistive type. These include thermoresistive gauges such as Talbot's (U.S. Pat. No. 2,894,390), in which the fluid cools a thermoresistive element whose resistance is therefore proportional to the amount of its area covered by fluid. Another example of resistive type floatless gauges includes gauges in which a resistance element is shorted at a point corresponding to the level of the fluid to be gauged, by the fluid itself, as in Wright (U.S. Pat. No. 3,003,355) or by a secondary fluid, as in Pleuger (U.S. Pat. No. 2,931,225). A final example comprises gauges in which the resistance of a volume of the fluid itself is measured as in Morris (U.S. Pat. No. 3,285,068).

These floatless gauges all have the disadvantage of being responsive to changes in the temperature and composition of the fluid to be gauged. This disadvantage has been overcome in the art by the addition of reference sensors. These, however, require the use of compensating bridge circuitry which adds cost and decreases reliability.

Against this background, a floatless electrical fluid level gauge was invented by M. Slavin which provides fluid level indication independent of the temperature or composition of the fluid to be gauged, without the use of additional means for compensation. Slavin's invention is fully disclosed in U.S. Pat. No. 3,465,588, assigned to the assignee of this application. Slavin teaches a single continuous resistance element depended into the fluid to be gauged, whereby an electric field is produced in the fluid from its surface to the bottom of its container. The magnitude of the field is proportional to the depth of the fluid because the resistance element is continuous. A collector is also depended into the fluid and acquires a potential equal to one-half the value of the potential of the resistance element at the surface of the fluid. The potential value of the collector results from the balance of ionic currents in the fluid which causes the collector to behave as the center tap of a resistive voltage divider having equal resistance arms. The disadvantage of Slavin's gauge is that in order to obtain the balanced voltage divider which Slavin teaches is required, a continuous resistance element is required; this adds substantially to the cost of producing the gauge.

This invention relates to a floatless electrical fluid level gauge in which fluid level indication is derived from the voltage appearing at the center tap of a resistive voltage divider network wherein said voltage divider network need not be, and typically is not, in balance, and has as an object the production of a floatless electrical fluid level gauge which is highly reliable and inexpensive to manufacture.

Another object of the invention is to provide a floatless electrical fluid level gauge which is wholly d. c. operated.

Another object is to provide such fluid level gauge which is adaptable to a wide range of fluid conductivity.

It is a further object to provide a floatless fluid level gauge which is particularly adaptable to gauging gasoline levels.

It is also an object of the invention to provide a gauge which will draw less than one microampere of current when used as an automotive gasoline gauge.

Yet another object is to provide a gauge which will provide any desired gauge function, linear or non-linear, which will indicate the depth or volume of fluid in a container of arbitrary shape.

These and other objects, features and advantages of the invention will appear from the following description and appended claims when read in view of the accompanying drawings.

Briefly, the invention is embodied in a fluid level gauge comprising three conductive elements which are depended into the fluid to be gauged. An electrical potential is maintained across a pair of said elements. One element of said pair of elements is maintained at a reference potential which is preferably the ground potential for the system in which the gauge is employed. This element will be referred to herein as the reference plane. The other element of said pair of elements is maintained at some potential above said reference potential and will be referred to herein as the potential plane. The third said conductive element is disposed between said pair of elements in one of the embodiments disclosed, and adjacent to said pair of elements in another of the embodiments disclosed. Said third element is referred to herein as the collector. Means are provided whereby the resistance of the portion of the fluid to be gauged, electrically appearing between the potential plane and the collector, varies with the depth of fluid at a rate different from the rate at which the resistance of the portion of fluid electrically between the collector and the reference element varies with the depth of fluid. Said means comprise alternatively shaping of the potential plane and reference element, or shaping or disposition of the collector, or the application to a portion of one of said pair of elements of a non-conductive substance. The collector therefore functions as the center tap of a resistor voltage divider network comprising the fluid between the potential plane and the collector as a first resistor, and the fluid between the reference element and the collector as a second resistor. An indicating device comprising an amplifier and voltmeter is connected between the collector and the reference potential.

In the drawings:

FIG. 1 is a diagrammatic view useful in explaining the operation of the invention.

FIG. 2 is a perspective, with portions of the structure broken away, of a modification of the embodiment illustrated diagrammatically in FIG. 1.

FIG. 3 is an elevation of an embodiment of the invention particularly adapted for use as an automotive fuel gauge.

FIG. 4 is a sectional view taken along the line 4—4 of FIG. 3.

FIG. 5 is a sectional view taken along the line 5—5 of FIG. 4.

FIG. 6 is a sectional view taken along the line 6—6 of FIG. 4.

FIG. 7 is a sectional view taken along the line 7—7 of FIG. 4.

FIG. 8 is a development of the outer conductive cylinder, or potential plane, of FIG. 3 illustrating the application of a non-conductive substance thereto.

FIG. 9 is a simplified schematic and perspective of an embodiment of the invention particularly suited for use in gauging lubricating oil level.

FIG. 10 is an elevation of the embodiment of FIG. 9.

FIG. 11 is a longitudinal section of a variant of the embodiment of FIG. 10.

FIG. 1 shows a fluid to be gauged 1 in a container 2, into which the gauge electrode elements 4, 5 and 6 are depended. The gauge electrode elements are fabricated from sheet metal stock. Element 4 is the potential plane and is connected to terminal 3, which provides for connection to a source of electrical potential not shown. Element 5 is the reference element and is shown connected with container 2 to the system ground 20. A potential difference therefore exists between potential plane 4 and reference plane 5, which causes an ionic current to flow in the portion of fluid 1 which is between conductive elements 4 and 5. Interposed between elements 4 and 5 is element 6, the collector. The collector is slantingly disposed between the other two elements so that the distance between the potential plane and the collector varies directly with depth and the distance between the reference plane and the collector varies inversely with depth. A current flowing between the potential plane and the reference plane, therefore flows through a first resistor comprising the fluid between the potential plane and the collector and a second resistor comprising the fluid between the collector and the reference plane. The two said resistances are electrically in series with each other. The collector comprises a tap at the junction of the two said resistances. Since the resistances are in series, the same current flows through each. The potential appearing at the collector is therefore a function of the ratio of resistance of the two resistors. The resistance of each resistor is a function of the conductivity of the fluid, the cross-sectional area of the current path, and the length of the current path. The cross-sectional area of the current paths of the two resistors are equal and the effective electrical lengths of the current paths of the two resistors vary oppositely as the depth of fluid varies. Since the potential appearing at the collector is a function of the ratio of the resistances, this potential may be seen to be independent of the conductivity of the fluid provided only that the fluid conductivity be uniform. The potential appearing at collector 6 is transmitted by conductor 7 to an amplifier 8 whose output drives a voltmeter 9 which is connected between the output of amplifier 8 and terminal 10 which is connected to the reference potential. The voltmeter may be calibrated to indicate the volume or depth of fluid 1 in container 2 as desired. Collector 6 is shown as a flat sheet, which provides a logarithmic gauge function, however, linearity or any desired non-linearity of gauge function can be provided by bending the collector into a curved shape. It is, of course, also possible to affect the gauge function by control of the amplifier function if desired. For example, with a flat collector as shown in the drawing, an overall linear function for the gauge system could be had by designing the amplifier to exhibit an antilogarithmic function.

FIG. 2 illustrates another form of the inventive gauge structure. Here, the potential plane 11 and the reference plane 12 are formed as right triangular conductive sheets and are joined along their respective hypotenuses in a coplanar orientation by an insulating adhesive 15. The collector 13 is a rectangular conductive sheet which is disposed parallel to the plane of the potential plane and reference plane. In this form of the invention the lengths of the conductive paths of the two fluid resistors are equal and the ratio of the current carrying cross-sectional areas of the two resistors varies as the depth of fluid varies. In all other respects the operation of the form of the invention shown in FIG. 2 is the same as that of the form shown in FIG. 1.

FIG. 3 shows an embodiment of the invention which is particularly adapted for use as an automotive fuel gauge. FIGS. 4 through 8 illustrate features and details of construction of this embodiment.

The embodiment of FIG. 3, indicated generally by 30, is a fuel gauge tank element comprising three concentric cylindrical conductive tubes 35, 36 and 34 which are mechanically, but not electrically, connected by plastic spacer 50 at one end to each other and to a mounting plate 31 adapted to depend the tubes into a fuel tank, not shown, through a hole cut into the upper surface of said tank. The innermost conductive tube 35 serves as the reference plane and is maintained at the automobile chassis ground potential. A screen-type fuel filter 25 is attached to the assembly at the lower end of inner conductive tube 35 by plastic spacer 60 thereby adapting said inner conductive tube to use as the fuel filling tube. The intermediate conductive tube 36 is the collector and is electrically connected to terminal 37 whereby it may be connected to the remote indicating device. The outermost conductive tube 34 is the potential plane and is electrically connected to terminal 33 which provides for connection to the high side of the automobile electrical system. Referring to FIG. 8 which shows a plane development of the cylindrical potential plane 34 of FIG. 3, the developed potential plane is indicated generally by 34a and its inner surface is being viewed. The inner surface of the outermost tube is painted with non-conductive paint 51 in a pattern determined by the desired gauge characteristic. This provides that only the unpainted area 52 of the potential plane will be effective in determining the current carrying cross-section of a first resistor comprising the fuel between the potential plane 34 and the collector 36. Therefore the ratio of resistance of said first resistor to the resistance of a second resistor comprising the fuel between the collector 36 and the reference plane 35 of FIG. 3 varies proportionally to the depth of fuel at the gauge elements.

The ratio of the resistances of these two fluid resistors is determinative of the voltage appearing at the collector. The actual value of the resistors is immaterial. In the absence of non-conductive paint, therefore, the collector potential will be constant regardless of the fluid level. This is true because the resistance of each resistor is determined by the conductivity of the fluid, the length of the current path, and the conductive area of the current path. Mathematically:

$$R = \rho \, l/A$$

where
$R$ is the resistance,
$\rho$ is the reciprocal of the conductivity of the fluid,
$A$ is the current carrying cross-sectional area, and
$l$ is the length of the current path.
Since we are dealing with concentric cylindrical resistors:

$$R_1 = \rho_1 \, l_1/\pi d_1 h_1$$

and $$R_2 = \rho_2 \, l_2/\pi d_2 h_2$$

where
$R_1$ is the resistance of the first fluid resistor comprising the fluid between reference plane 35 and collector 36,
$\rho_1$ is the reciprocal of the conductivity of the fluid comprising said first fluid resistor,
$l_1$ is the length of the current path in said first fluid resistor,
$d_1$ is the mean effective diameter of the first fluid cylinder, between electrodes 35 and 36
$h_1$ is the height to which said first cylinder contains fluid,
$R_2$ is the resistance of the second fluid resistor comprising the fluid between potential plane 34 and collector 36,
$\rho_2$ is the reciprocal of the conductivity of the fluid comprising said second fluid resistor,
$l_2$ is the length of the current path in said second fluid resistor,
$d_2$ is the mean effective diameter of the second fluid cylinder, between electrodes 34 and 36,
$h_2$ is the height to which said second cylinder contains fluid.
Since uniform fluid conductivity was assumed, $\rho_1 = \rho_2$. Since at any fluid level the height of the fluid resistor cylinders is equal, $h_1 = h_2$. Therefore, the equations may be simplified:

$$R_1 = \rho \, l_1/\pi d_1 h$$

$$R_2 = \rho \, l_2/\pi d_2 h.$$

The ratio of the resistors is:

$$R_1/R_2 = (l_1 d_1)/(l_2 d_2).$$

Since we are dealing with concentric circular cylinders, the factors $l_1$, $l_2$, $d_1$, and $d_2$ are constants. Therefore, the resistance of each resistor is a linear function of fluid height, and the resistance ratio is not a function of fluid height.

With the application of non-conductive paint to either the reference plane or the potential plane (the potential plane 34 shown painted in the drawing), the resistance of one resistor, contacting only unpainted surfaces (35 and 36), is a linear function of fluid height, and the resistance of the other resistor, contacting one painted surface (34), is a higher order function of fluid height. This leads to the mathematical conclusion:

$$dR_1/dh = K$$

where
  $K$ is a constant,
and $$dR_2/dh = f(h)$$

where
  $f(h)$ is a function describing the geometry of the non-conductive coating.

The application of non-conductive paint, then, causes the resistance ratio to be a function of fluid height; said function is the gauge function and may be selected at the designer's option by design of the geometry of the non-conductive coating. The potential at the collector is thus indicative of the depth of fuel and may be measured by a voltmeter connected between terminal 37 and vehicle ground. The meter may be calibrated to read in terms of depth or volume of fuel as desired. A linear or any desired non-linear gauge function, or compensation for irregular fuel tank shape may be provided by selection of the pattern in which the non-conductive coating is applied to the potential plane.

FIG. 4 shows conductive elements 34, 35 and 36 in end view, the mode of attachment of the gauge elements to the supporting plate 31 by means of fasteners 41, 42 and 43 comprising portions of the plastic spacer material which are ultrasonically staked over the periphery of holes in plate 31, terminals 33 and 37, their corresponding conductive tabs 33' and 37' which respectively connect terminal 33 to the potential plane 34 and terminal 37 to the collector 36, and ground tab 45.

FIG. 5 is a sectional view of a portion of the fuel gauge taken along the line 5—5 of FIG. 4. FIG. 5 shows in detail spacer block 50 which is of plastic material which has been molded about conductive plate 63 after the terminals and contact strips have been punched therefrom. The depending gauge element assembly is secured to spacer block 50 by a dimple 61 in the potential plane 34. Terminal 33 is connected to potential plane 34 by connecting strip 33'. Terminal 33 and connecting strip 33' comprise a single continuous conducting strip which has been punched from sheet 63. Said continuous conductive strip departs from the plane of the section in a roughly chordal arc in order to avoid electrical contact with the reference plane 35.

FIG. 6 is a sectional view of a portion of the fuel gauge taken along the line 6—6 of FIG. 4. FIG. 6 particularly points out the connection of collector 36 to terminal 37 by connecting strip 37'. This connection may be constructed in the same way as the connection between potential plane 34 and terminal 33 discussed above. Alternatively, strip 37' may be connected to the input terminal of an integrated circuit amplifier whose output terminal is connected to terminal 37.

FIG. 7 is a sectional view of the upper portion of the fuel gauge taken along the line 7—7 of FIG. 4. This view points out particularly the method whereby the gauge assembly is attached to mounting plate 31, the location of an integrated circuit amplifier within the gauge assembly, and the gauge grounding scheme. The gauge assembly is attached to the mounting plate by first placing a resilient gasket 62 on the top surface of plastic spacer block 50. Spacer block 50 is so molded that a portion of the plastic material extends upwardly through a hole in gasket 62 and a corresponding hole in mounting plate 31; said plastic material is then ultrasonically staked over to form fastener 41. The automobile chassis ground potential is conducted from the fuel tank to reference plane 35 by mounting bracket 31. The ground potential is also conducted from bracket 31 to integrated circuit amplifier chip 70 by ground tab 45. Integrated circuit chip 70 is interconnected within the gauge structure to perform the function of amplifier 8 which was described with reference to FIG. 1. FIG. 7 shows the ground connection to amplifier chip 70. A similar connection between chip 70 and terminal 33 provides amplifier operating power. The amplifier input terminal is connected to contact strip 37' and the amplifier output terminal is connected to terminal 37.

FIGS. 9, 10 and 11 illustrate an embodiment of the invention particularly adapted to use as an automotive lubricating oil low level warning system. FIG. 9 illustrates the principle of operation of this embodiment. The automobile battery, shown schematically as 93, has its hot terminal connected to a conductive, cylindrical segment 94 comprising the potential plane, and its ground side connected to a second conductive cylindrical segment 95 which comprises the reference plane. The two cylindrical segments are of equal radius and are disposed coaxially with the lower edge of the potential plane cylinder a short distance above the upper edge of the reference plane cylinder. The collector 96 is a conductive rod which is disposed along the axis of the cylinders. Collector 96 is connected to an amplifier 98 which is in turn connected to an indicating device comprising voltage responsive switch 99a and indicator lamp 99b. When the crankcase is full both cylindrical segments are completely immersed in and filled with oil and collector 96 is at a potential determined by the relative volumes of the cylinders. When the oil level drops below the top of potential plane 94, the resistance of the oil encompassed by said potential plane increases because the current carrying cross-sectional area of the oil decreases. This produces a change in the potential of collector 96. When the potential of collector 96 reaches a predetermined level, corresponding to an undesirably low oil level, voltage responsive switch 99a is actuated causing indicator lamp 99b to light.

FIG. 10 shows an oil level warning device embodying the present invention which is constructed integrally with the oil pan drain plug. A bolt 101 having lower threaded portion 102 mechanically secures the elements of the device in cooperation with nut 103 and provides a portion of the electrical conduction path between the automobile battery and potential plane 106. A wire from the hot side of the battery not shown is connected to the bolt at 102 and is securely clamped between nuts 103 and 104. Electrical contact between bolt 101 and the remainder of the device is prevented by plastic insulator 105. Reference plane 107 includes a threaded portion 107a threaded to engage the threads of the oil pan drain hole, and hexagonal nut portion 107b whereby the device may be inserted into and removed from the oil pan. Electrical connection of reference plane 107 to the automobile ground is accomplished by direct contact to the oil pan at 107a. The amplifier shown at 98 in FIG. 9 may, if desired, be an integrated circuit amplifier located in a hollowed volume in hex nut member 107b.

In the FIG. 10 embodiment oil communicates between the crankcase and the gauge through the gap between potential plane 106 and reference plane 107. The top surface of potential plane 106 has a plurality of vent holes which prevent an air bubble from becoming trapped within the potential plane structure.

If a continuous reading oil level gauge is desired rather than a low level warning, it is considered an obvious alternative within the scope of this invention to increase the height of potential plane 106 so that it extends to the maximum height of oil in the crankcase, and to replace voltage responsive switch 99a and lamp 99b of FIG. 9 with an appropriately calibrated voltmeter.

FIG. 11 is a longitudinal sectional view of a minor variant of the gauge of FIG. 10. The variation from the FIG. 10 embodiment consists of mechanically closing the gap between potential plane 106 and reference plane 107 with a ring of insulating material 111, providing a plurality of holes 113 in the lower portion of reference plane 107, and including fibrous filter material 112 within the gauge structure whereby mechanical resistance to the flow of oil in and out of the gauge structure is provided. The purpose of these variations is to damp any sloshing of the oil within the gauge which might occur as a result of vehicular motion. All other features shown in FIG. 11 are also present in the FIG. 10 embodiment.

Collector 108 is positioned and insulated within the structure by plastic spacer 116. Additional electrical insulation is provided between bolt 101 and collector 108 by insulating material 117. Bolt 101 is in electrical contact with potential plane 106. Vent holes 115 are provided in the upper surface of potential plane 106.

The invention claimed is:

1. A floatless fluid level gauge for gauging fluid comprising:
   a pair of electrodes comprising first and second electrodes immersed in said fluid;
   means for maintaining a potential difference between said first and second electrodes;
   a third electrode immersed in said fluid and disposed in the current path between said first and second electrodes, said first, second and third electrodes being so configured that the ratio of the resistance through said current path in said fluid between said first and third electrodes with respect to the resistance through said current path in said fluid between said second and third electrodes has a generally unique value for each depth of immersion of said electrodes in said fluid; and means for sensing the potential of said third electrode, wherein said pair of electrodes comprise two conductive sheets non-conductively joined along an edge of each to form a unitary sheet and said third electrode is a conductive sheet disposed in spaced relationship to said pair of electrodes.

2. The gauge of claim 1 wherein said conductive sheets are planar in form.

3. A floatless fluid level gauge for gauging fluid comprising:
   a pair of electrodes comprising first and second electrodes immersed in said fluid;
   means for maintaining a potential difference between said first and second electrodes;
   a third electrode immersed in said fluid and disposed in the current path between said first and second electrodes, said first, second and third electrodes being so configured that the ratio of the resistance through said current path in said fluid between said first and third electrodes with respect to the resistance through said current path in said fluid between said second and third electrodes has a generally unique value for each depth of immersion of said electrodes in said fluid; and means for sensing the potential of said third electrode, wherein said pair of electrodes comprise two congruent right triangular conductive sheets non-conductively joined along their hypotenuses to form a rectangular sheet and said third electrode is a rectangular conductive sheet disposed in spaced relationship to said pair of electrodes.

4. The gauge of claim 3 wherein said third electrode is disposed in a plane parallel to the plane of the first mentioned rectangular sheet.

5. A floatless fluid level gauge for gauging fluid comprising:
   a pair of electrodes comprising first and second electrodes immersed in said fluid;
   means for maintaining a potential difference between said first and second electrodes;
   a third electrode immersed in said fluid and disposed in the current path between said first and second electrodes, said first, second and third electrodes being so configured that the ratio of the resistance through said current path in said fluid between said first and third electrodes with respect to the resistance through said current path in said fluid between said second and third electrodes has a generally unique value for each depth of immersion of said electrodes in said fluid; and means for sensing the potential of said third electrode, wherein said pair of electrodes comprise two conductive tubes of similar cross-section disposed one above the other and said third electrode is an elongated conductive body disposed within said tubes.

6. A floatless fluid level gauge for gauging fluid comprising:
   a pair of electrodes comprising first and second electrodes immersed in said fluid;
   means for maintaining a potential difference between said first and second electrodes;
   a third electrode immersed in said fluid and disposed in the current path between said first and second electrodes, said first, second and third electrodes being so configured that the ratio of the resistance through said current path in said fluid between said first and third electrodes with respect to the resistance through said current path in said fluid between said second and third electrodes has a generally unique value for each depth of immersion of said electrodes in said fluid; and means for sensing the potential of said third electrode, wherein said pair of electrodes comprise two right cylindrical segments having similar cross-sections and disposed coaxially one above the other, and said third electrode is disposed within said right cylindrical segments parallel to the axis thereof and generally coextensive therewith.

7. The gauge of claim 6 wherein said right cylindrical segments are of equal height.

8. The gauge of claim 6 wherein said third electrode is a third right cylindrical segment disposed within said two right cylindrical segments.

9. The gauge of claim 6 wherein one of said two cylindrical segments is threaded over a portion of its outer surface, and with additionally, a base member closing one end of said one segment.

10. The gauge of claim 9 wherein said base member is shaped for engagement by a wrench.

11. The gauge of claim 9 wherein said base member has a hollowed portion therein and wherein said gauge additionally includes means for sensing the potential of said third electrode comprising an integrated circuit device disposed within said hollowed portion of said base member.

12. The gauge of claim 9, with additionally, fibrous filter means for damping the movement of fluid within said gauge.

13. The gauge of claim 9 wherein said means for sensing comprises voltmeter means responsive to the potential appearing on said third electrode.

14. The gauge of claim 9 wherein said means for sensing potential comprises:
   potential responsive switching means connected to said third electrode; and,
   indicator means controlled by said switching means.

15. A floatless fluid level gauge comprising:
   three electrodes immersed in the fluid to be gauged, said electrodes being so configured that the ratio of the volume of said fluid between a first and third of said electrodes with respect to the volume of said fluid between said third and a second of said electrodes has a generally unique value for each depth of immersion of said electrodes in said fluid;
   means for maintaining a potential difference between two of said electrodes, whereby an electric current is caused to flow between said two electrodes, the other of said electrodes being disposed in the current path between said two electrodes; and,
   means for sensing the potential of said third electrode, wherein said first and second electrodes comprise two right cylindrical segments of unequal cross-section disposed coaxially one within the other, and said third electrode is a right cylindrical segment of cross-section intermediate to the cross-sections of the electrodes of the other two electrodes.

16. The gauge of claim 15 including additionally a non-conductive coating applied to one surface of one of said other two electrodes whereby the effective conductive area of said coated electrode is caused to vary as a non-linear function of the level to which fluid contacts said coated electrode.

17. The gauge of claim 16 wherein said coated electrode is the outermost of said cylindrical segments and said coated surface is the inner surface thereof, and the innermost of said cylindrical segments is maintained at said reference potential and includes additionally a filtering screen at the lower end thereof whereby said innermost cylindrical segment is adapted to be used for filling a container with the fluid to be gauged.

18. The gauge of claim 15 including additionally a mounting plate and a plastic spacer block attached thereto for supporting said electrodes in the fluid to be gauged.

19. The gauge of claim 18 wherein said means for sensing potential comprises:
utilization means responsive to said potential at said third electrode; and,
means connecting said third electrode to said utilization means.

20. The gauge of claim 19 wherein said means for connecting comprises an integrated circuit device disposed within said plastic spacer block.

* * * * *